United States Patent
Keitsch et al.

(10) Patent No.: US 12,412,907 B2
(45) Date of Patent: Sep. 9, 2025

(54) BIPOLAR PLATE AND FUEL CELL STACK

(71) Applicant: AUDI AG, Ingolstadt (DE)

(72) Inventors: Oliver Keitsch, Heilbronn (DE); Armin Siebel, Neckarsulm (DE); Sebastian Voigt, Heilbronn (DE)

(73) Assignee: AUDI AG, Ingolstadt (DE)

( * ) Notice: Subject to any disclaimer, the term of this patent is extended or adjusted under 35 U.S.C. 154(b) by 398 days.

(21) Appl. No.: 18/003,855

(22) PCT Filed: Oct. 25, 2021

(86) PCT No.: PCT/EP2021/079463
§ 371 (c)(1),
(2) Date: Dec. 29, 2022

(87) PCT Pub. No.: WO2022/090119
PCT Pub. Date: May 5, 2022

(65) Prior Publication Data
US 2023/0268521 A1    Aug. 24, 2023

(30) Foreign Application Priority Data
Oct. 28, 2020   (DE) ..................... 10 2020 128 310.5

(51) Int. Cl.
*H01M 8/0265*   (2016.01)
*H01M 8/0254*   (2016.01)
*H01M 8/0267*   (2016.01)

(52) U.S. Cl.
CPC ....... *H01M 8/0265* (2013.01); *H01M 8/0254* (2013.01); *H01M 8/0267* (2013.01)

(58) Field of Classification Search
CPC ............ H01M 8/0265; H01M 8/0254; H01M 8/0267; H01M 8/0258; Y02E 60/50
See application file for complete search history.

(56) References Cited

U.S. PATENT DOCUMENTS

| | | | |
|---|---|---|---|
| 2003/0215695 A1 | 11/2003 | Suzuki et al. | |
| 2007/0082252 A1* | 4/2007 | Goebel | H01M 8/026 429/457 |
| 2007/0269697 A1 | 11/2007 | Randon et al. | |
| 2010/0028742 A1 | 2/2010 | Jeon et al. | |
| 2011/0207018 A1* | 8/2011 | Nakagawa | H01M 8/1004 429/483 |
| 2017/0025690 A1* | 1/2017 | Andreas-Schott | H01M 8/0202 |
| 2019/0288302 A1 | 9/2019 | Nonoyama | |

FOREIGN PATENT DOCUMENTS

| | | | | |
|---|---|---|---|---|
| CN | 110088956 A | * | 8/2019 | ......... H01M 8/1004 |
| CN | 114008829 A | * | 2/2022 | ......... H01M 8/1004 |
| DE | 102005007353 A1 | | 9/2005 | |
| DE | 10394231 B4 | | 8/2009 | |
| DE | 102014206333 A1 | | 10/2015 | |
| DE | 102015104300 A1 | | 9/2016 | |
| DE | 102016212785 A1 | | 3/2017 | |
| DE | 202016107302 U1 | * | 3/2018 | ............ H01M 8/188 |
| EP | 2348567 A1 | | 7/2011 | |

OTHER PUBLICATIONS

International Preliminary Report on Patentability, dated Jul. 12, 2022, for International Patent Application No. PCT/EP2021/079463. (5 pages).
International Search Report, mailed Feb. 14, 2022, for International Patent Application No. PCT/EP2021/079463. (2 pages).

* cited by examiner

*Primary Examiner* — Muhammad S Siddiquee
(74) *Attorney, Agent, or Firm* — Seed Intellectual Property Law Group LLP

(57) ABSTRACT

A bipolar plate formed from two single plates joined together, formed with a reactant flow field on their plate surfaces facing away from each other, comprises multiple flow ducts for a reaction medium, bounded by walls of webs, wherein the webs and the flow ducts of one of the single plates run opposite the webs and the flow ducts of the other of the single plates in an active region, thus forming coolant ducts of a coolant flow field extending between the single plates, the reactant flow fields and the coolant flow field being each connected fluidically to a media port across a distribution region situated outside the active region, and there being a cross channeling of the two reaction media for a portion in the distribution region. For the channeling of the coolant in the distribution region free of cross currents, at least one of the single plates may be formed with a reduction in height of the webs on its plate surface facing toward the other of the single plates in an intersection region of the reaction media channels, so that two adjacent flow ducts are fluidically connected by the reduction.

10 Claims, 3 Drawing Sheets

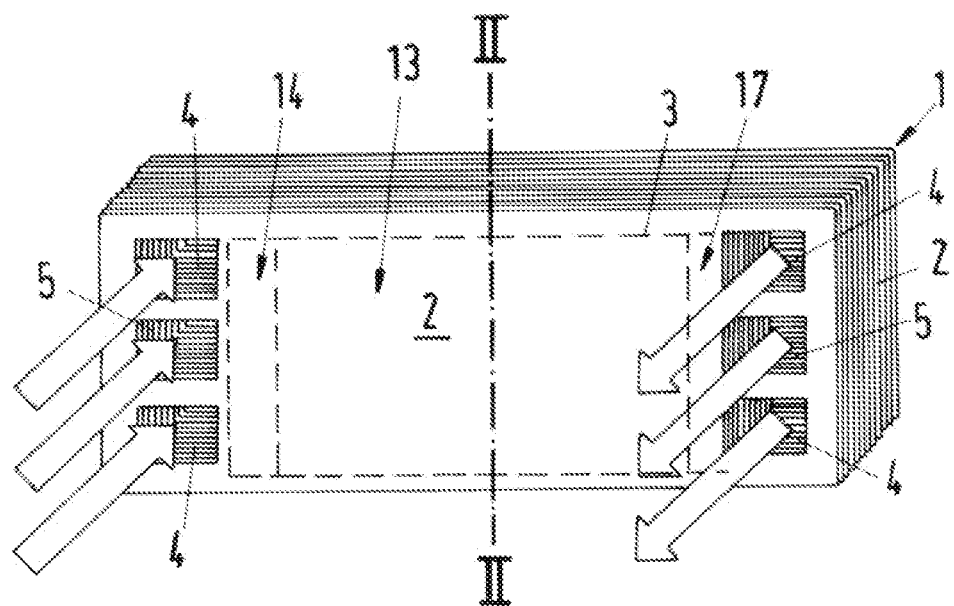
Fig.1
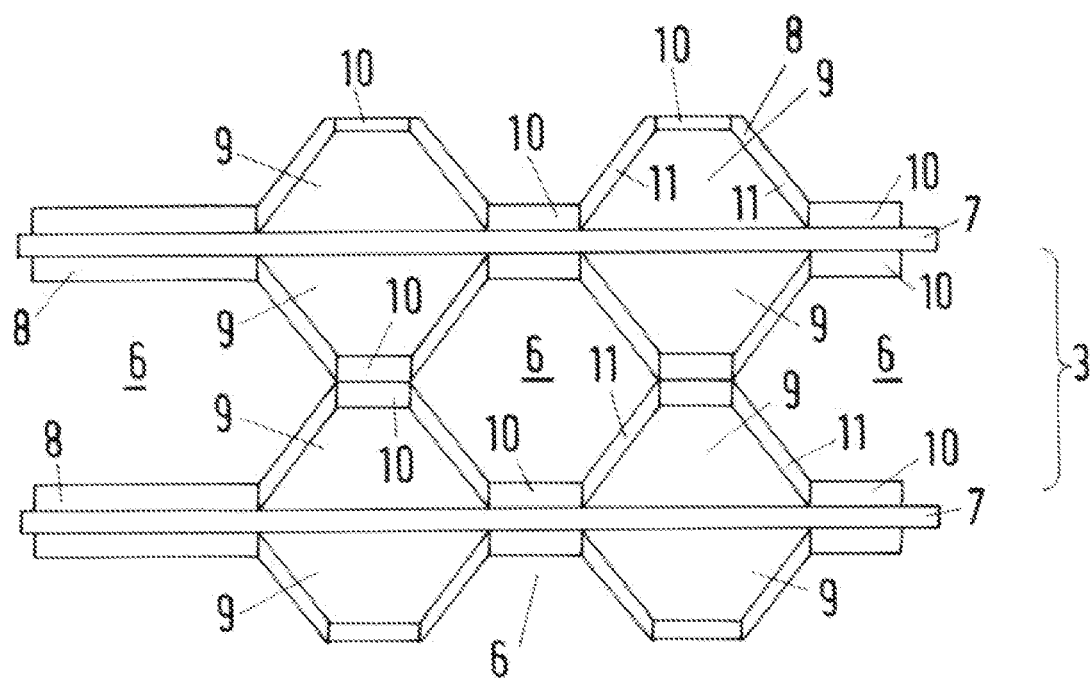
Fig.2 II-II

BIPOLAR PLATE AND FUEL CELL STACK

BACKGROUND

Technical Field

Embodiments of the invention relate to a bipolar plate formed from two single plates joined together, formed with a reactant flow field on their plate surfaces facing away from each other. Embodiments of the invention furthermore relate to a fuel cell stack having a plurality of fuel cells associated with such bipolar plates.

Description of the Related Art

Fuel cell devices are used for the chemical transformation of a fuel with oxygen to form water in order to create electric energy. For this, fuel cells contain as their key component the so-called membrane electrode assembly (MEA), which is an assemblage of a proton-conducting membrane and an electrode arranged on either side of the membrane (anode and cathode). Furthermore, gas diffusion layers (GDL) may be arranged on either side of the membrane electrode unit at the sides of the electrodes facing away from the membrane. In operation of the fuel cell device having a plurality of fuel cells assembled into a fuel cell stack, the fuel, especially hydrogen $H_2$ or a gas mixture containing hydrogen, is supplied to the anode, where an electrochemical oxidation of $H_2$ to $H^+$ takes place, giving off electrons. Through the electrolyte or the membrane which separates the reaction spaces from each other and electrically insulates them, a transport of the protons $H^+$ from the anode space to the cathode space occurs. The electrons provided at the anode are taken by an electrical line to the cathode. The cathode is supplied with oxygen or a gas mixture containing oxygen, so that a reduction of $O_2$ to $O^{2-}$ occurs, taking up electrons. At the same time, these oxygen anions react in the cathode space with the protons transported across the membrane to form water.

The reactant gases are supplied to the electrodes of the fuel cells by means of bipolar plates. In addition to the reactant gases, a cooling medium is also taken through the bipolar plates on account of the heat generated during the fuel cell reaction, so that three different media are taken through the bipolar plates in the smallest of spaces.

When supplying the fuel cells with the reactants, these are taken by main ducts (ports) to the bipolar plates, which is supposed to bring about a distribution of the reactants in an active region, in order to supply the entire surface of the electrodes as evenly as possible by means of a flow field. Since multiple bipolar plates are stacked with the membrane electrode units in the fuel cell stack, seals are used in order to seal off the main ducts along the fuel cell stack. In addition, a good sealing effect against the cooling medium flowing in coolant ducts must occur.

In US 2007/0 269 697 A1 there is described a fuel cell structure having bipolar plates, in which a selected membrane electrode assembly is provided in order to form two different gas ducts on both sides of the shafts. A separator plate for a fuel cell system in which an equalizing of the reaction media flows should be produced in a distribution region is known from DE 20 2016 107 302 U1. A bipolar plate in which the webs of a reaction medium are formed with interruptions in the distribution region is known from DE 10 2015 104 300 U1.

Thus far, less attention has been paid to the channeling of the cooling medium across or in the bipolar plates in the development phase than to the channels for the reactant flows. As a result, conventional bipolar plates still do not provide an optimal equal distribution for the cooling medium in the distribution region, so that it may happen that a local overheating (so-called hot spot) may also occur in the active region on account of a low volume flow which occurs locally.

BRIEF SUMMARY

Some embodiments relate to a bipolar plate formed from two single plates joined together, formed with a reactant flow field on their plate surfaces facing away from each other. Each reactant flow field comprises a plurality of flow ducts for a reaction medium, bounded by walls of webs, the webs and the flow ducts of one of the single plates running opposite the webs and the flow ducts of the other of the single plates in an active region, in order to form coolant ducts for a coolant flow field extending between the single plates. The reactant flow fields and the coolant flow field are each connected fluidically to a corresponding media port across a distribution region situated outside the active region. There is a cross channeling of the two reaction media for a portion in the distribution region, so that the distribution of the respective operating medium can be equalized for the flow field coming from the respective media port.

Some embodiments provide a bipolar plate and a fuel cell stack which promote a uniform distribution not only of the reaction media but also of the coolant.

The bipolar plate described herein may be characterized in particular in that, for the channeling of the coolant in the distribution region free of cross currents, at least one of the single plates is formed with a reduction in height of the webs on its plate surface facing toward the other of the single plates in an intersection region of the reaction media channels, so that two adjacent flow ducts are fluidically connected by the reduction.

Each time only the structures not already used for the gas distribution in one of the two plate halves remain free for the distribution of the coolant, which basically means all those surfaces in which the distribution structures do not overlap. It may therefore occur that an overlapping of the distribution structures also causes a crossing of the coolant channels, so that eddies and therefore turbulent flows are generated, resulting in an unequal distribution of the coolant. This unequal distribution is counteracted by the reductions of the web heights in the intersection region of the reaction media channels. The interrupting of the flow channeling webs between two gas ducts hardly affects the flow and the equal distribution at the inlet side of the distribution region. In this way, however, it is possible to avoid cross currents in the coolant, which would otherwise experience too high an additional pressure loss due to the mixing of two intersecting coolant media flows. Furthermore, it becomes possible to influence the coolant distribution in a specific positive manner in order to achieve an optimal equal distribution.

The coolant may be channeled up to the intersection region of the reaction media of a negative of one of the single plates, and the coolant may then be channeled from the intersection region of the reaction media of a negative of the other of the single plates. Thus, for example, the distribution and channeling of the coolant across the distribution region can be done with the aid of the flow field of a first reaction medium (such as the fuel/anode plate), while in the intersection region there is a transfer of the coolant to the flow channels of the other reaction medium (such as air/cathode plate) free of cross currents.

In this regard, the coolant may be channeled up to the intersection region of a negative of one of the reactant flow fields of the single plates, and the coolant can then be channeled from the intersection region of a negative of the other of the reactant flow fields of the single plates.

In order to produce a desirable equal distribution of the coolant over the distribution region and thus also at the active region, it is advisable for a plurality of reductions in height of the webs of the other of the single plates to be present along the reduction-free webs of one of the single plates. Of course, one should also make sure that no crossings of the flows of the coolant are created in this case.

To ensure this, a number of the reductions may decrease with increasing flow distance from their corresponding media port. Hence, the number of interruptions of the webs is reduced as the flow of fuel progresses or as the flow of cathode gas progresses, so that a cross of the coolant flow present on the inner side of the plate is prevented.

The reduction-free webs of one of the single plates may be formed with a stepwise decreasing length with increasing flow distance from their corresponding media port. This likewise prevents a crossing of the coolant flow.

The possibility exists of channeling the coolant flow through a plurality of the intersection regions with the reduction of the web height, and deflecting the coolant flow at exactly one of the intersection regions. Thus, the partial coolant flow undergoes only one deflection and is not further divided.

However, in order to bring about a further dividing of the coolant flow, the coolant flow may be channeled through a plurality of the intersection regions with the reduction of the web height, and the coolant flow may be deflected at least at two of the intersection regions.

A turbulent flow by intersections of coolant flows can be especially effectively prevented in that the reduction forms a web height of zero; thus, the web is entirely interrupted, without causing a mixing of the operating media.

The benefits, advantageous embodiments and effects explained in connection with the bipolar plate hold equally for the fuel cell stack, outfitted with a plurality of fuel cells having the bipolar plates described herein. This also is distinguished by an improved heat management thanks to avoiding of local hot spots in the distribution region, which might be produced by a blocked crossing of partial coolant flows.

The features and combinations of features mentioned above in the description as well as the features and combinations of features mentioned below in the description of the figures and/or shows solely in the figures can be used not only in the particular indicated combination, but also in other combinations or standing alone. Thus, embodiments not shown or explained explicitly in the figures, yet deriving and producible from the explained embodiments by separated combinations of features shall also be deemed to be encompassed and disclosed by the present disclosure.

BRIEF DESCRIPTION OF THE SEVERAL VIEWS OF THE DRAWINGS

Further benefits, features and details will emerge from the claims, the following description of embodiments, and the drawings.

FIG. 1 shows a schematic representation of a fuel cell stack comprising a plurality of fuel cells with the bipolar plates showing the main ducts.

FIG. 2 shows a schematic representation of section II-II through the bipolar plate of FIG. 1.

DETAILED DESCRIPTION

Figure 3:
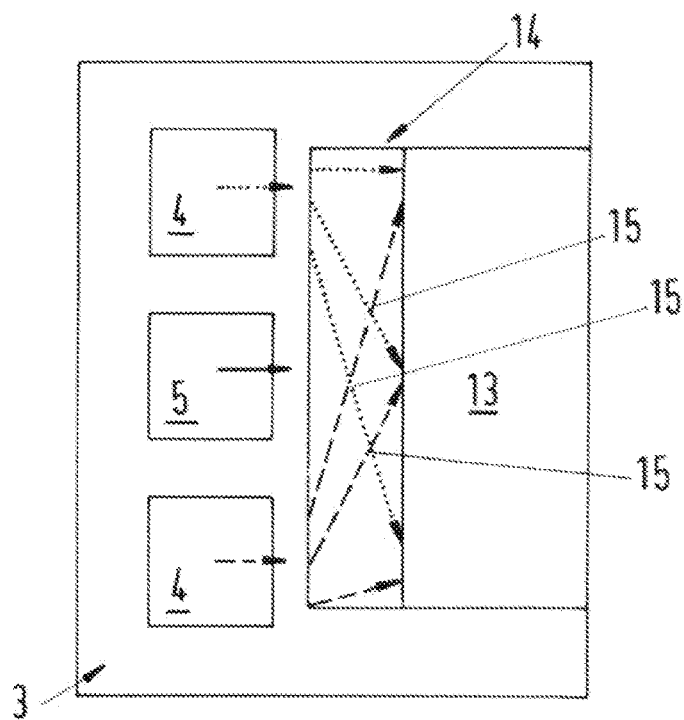
FIG. 3 shows a schematic detail top view of the distribution region of the bipolar plate, in which the channeling of the first reaction medium is shown by dotted line and in which the channeling of the second reaction medium is shown by dashes.

A fuel cell stack 1 shown in FIG. 1 consists of a plurality of fuel cells 2 switched in a row. Each of the fuel cells 2 comprises an anode and a cathode as well as a proton-conducting membrane separating the anode from the cathode. The two electrodes together with the membrane form a membrane electrode assembly 7 (MEA). The membrane is formed from an ionomer, such as a sulfonated tetrafluorethylene polymer (PTFE) or a polymer of perfluorinated sulfonic acid (PFSA). Alternatively, the membrane can be formed as a sulfonated hydrocarbon membrane.

Through anode spaces inside the fuel cell stack 1 fuel is supplied to the anodes (for example, hydrogen). In a polymer electrolyte membrane fuel cell (PEM fuel cell), fuel or fuel molecules are split into protons and electrons at the anode. The membrane lets through the protons (for example, H"), but it not permeable to the electrons (e). At the anode the following reaction occurs: $2H_2 \rightarrow 4H^+ 4e^-$ (oxidation/electron surrender). While the protons pass through the membrane to the cathode, the electrons are taken by an external circuit to the cathode or to an energy accumulator. Through cathode spaces inside the fuel cell stack 1 the cathodes can be supplied with cathode gas (such as oxygen or air containing oxygen), so that the following reaction occurs at the cathode side: $O_2 + 4H^+ + 4e^- \rightarrow 2H_2O$ (reduction/electron uptake).

Air compressed by a compressor is supplied to the fuel cell stack 1 by a cathode fresh gas line. In addition, the fuel cell stack 1 is connected to a cathode exhaust gas line. At the anode side, hydrogen kept in a hydrogen tank is supplied to the fuel cell stack 1 by an anode fresh gas line in order to provide the reactants needed for the electrochemical reaction in a fuel cell 2. These gases are handed over to bipolar plates 3, which comprise main ducts 4 (ports) for the distribution of the gases to the membrane and the exit line. In addition, the bipolar plates comprise main coolant ducts 5 (ports) for the channeling of a cooling medium in a coolant duct 6, so that three different media are carried in the smallest of spaces.

Thus, FIG. 1 also shows the main ducts 4, 5, each time assembled in pairs, of a plurality of fuel cells 2 with bipolar plates 3, forming the fuel cell stack 1.

A detail cutout view of the fuel cell stack 1 along the sectioning line II-II of FIG. 1 is shown in FIG. 2. This sectioning line runs through the active region 13 of the fuel cell stack 1. The active region 13 of the bipolar plate 3 is naturally not itself electrochemically active, but it is situated next to those constituents of the fuel cell 2 in which the electrochemical fuel cell reaction occurs. It can be noticed that the bipolar plate 3 has reactant flow fields on its surfaces facing away from each other in this active region 13, being situated opposite each other and thus forming an opposite configuration. The reactant flow fields each comprise a plurality of flow ducts 9 for the particular reaction medium, bounded by walls 11 of webs 10. The webs 10 and the flow ducts 9 of one of the single plates 8 are thus configured to run opposite the webs 10 and the flow ducts 9 of the other of the single plates 8 in this active region 13. In this way, coolant ducts 6 are formed for a coolant flow field extending between the single plates 8.

When the coolant is not present in the coolant ducts 6 with the same pressure or with the same volume flow, sites of local overheating (so-called hot spots) may occur. It is therefore required to distribute the coolant flow more evenly, in order to avoid such sites of local overheating. The bipolar plate 3 as described herein can assist in distributing the coolant flow more evenly.

FIG. 3 illustrates that the bipolar plate 3 comprises a distribution region 14 between its main ducts and the active region 13, in which there occurs a channeling of the two reaction media with cross currents in a portion thereof. The region in which the channels of the two reaction media cross over will be called the intersection region 15 in the following.

So that the coolant is channeled in this distribution region 14 free of intersections, at least one of the single plates 8 is formed with a reduction 16 in height of the webs 10 on its plate surface facing toward the other of the single plates 8 in the intersection regions 15 of the reaction media channels, the height of the webs 10 being reduced to zero, and thus there is a complete interruption of the particular web 10. Thanks to this reduction 16 or interruption, two adjacent flow ducts 9 are fluidically connected by the reduction 16.

Figure 4:
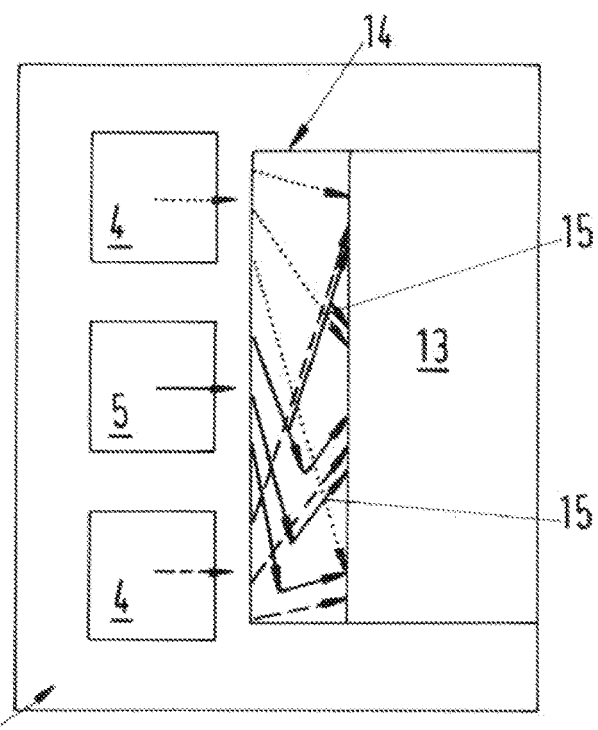
FIG. 4 shows a representation corresponding to FIG. 4 of the distribution region of the bipolar plate, in which the channeling of the first reaction medium is shown by dotted line, the channeling of the second reaction medium is shown by dashes, and the channeling of the coolant is shown by solid line.

FIG. 4 shows that the coolant in the bipolar plate 3 is channeled up to the intersection region 15 of a negative of one of the single plates 8, and the coolant is then channeled from the intersection region 15 of a negative of the other of the single plates 8. In particular, it can be provided that the coolant is channeled in the distribution region 14 of the bipolar plate 3 up to the intersection region 15 of a negative of one of the reactant flow fields of the single plates 8, and the coolant is then channeled from the intersection region 15 of a negative of the other of the reactant flow fields of the single plates 8.

Figure 5:
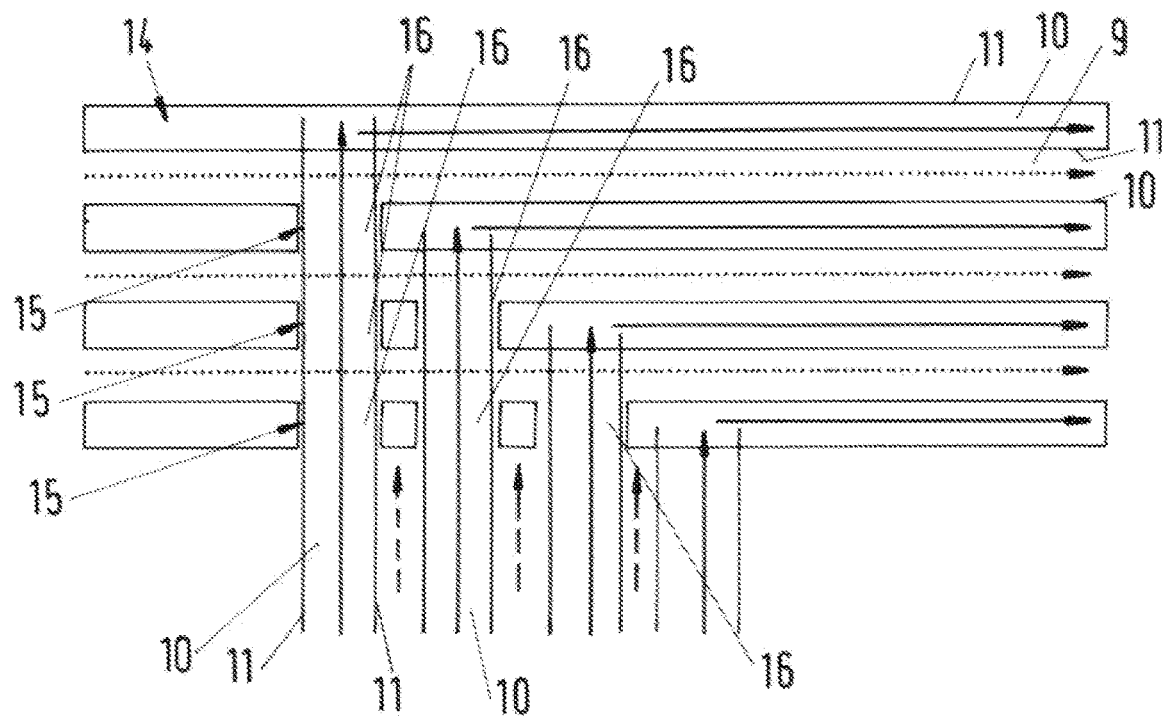
FIG. 5 shows a detail view of the distribution region, where reductions of the web height are present at its intersection regions of the channels of the reaction media, so that the coolant channel does not cross itself.
Figure 6:
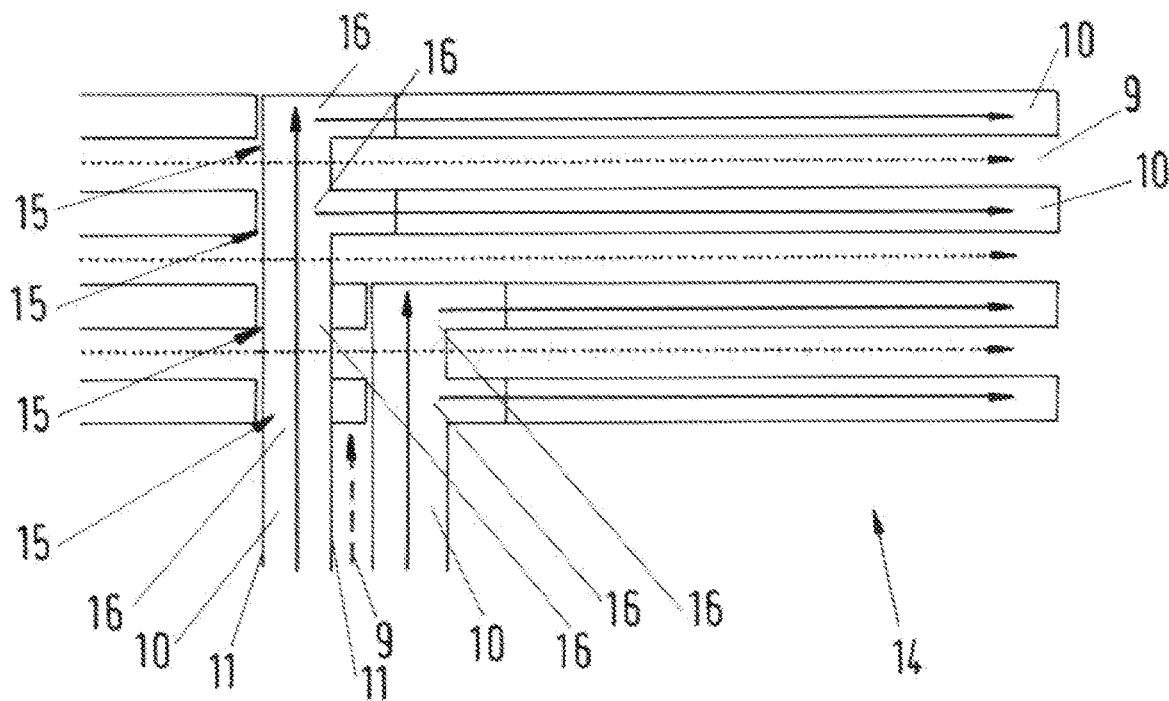
FIG. 6 shows an alternative configuration corresponding to FIG. 5 of the crossing-free channeling of the coolant, in which there is a branching/diversion of the cooling medium at multiple intersection regions of the reaction media.

FIGS. 5 and 6 show the possibility of the bipolar plate 3 having a plurality of reductions 16 in height of the webs 10 of the other of the single plates 8 along the reduction-free webs 10 of one of the single plates 8, and of the number of the reductions 16 decreasing with increasing flow distance from their corresponding media port 4. In the example of FIG. 5, the number decreases from three reductions 16 to two reductions 16, and then to a single reduction 16 (from left to right). It will further be noticed that the reduction-free webs 10 of the other of the single plates 8 are formed with a stepwise decreasing length with increasing flow distance from their corresponding media port 4.

FIG. 5 moreover shows the possibility of the coolant flow, indicated by solid line, being channeled through a plurality of the intersection regions 15 with the reduction 16 of the web height, and of the coolant flow being deflected at exactly one of the intersection regions 15, namely, at one end of a reduction-free web 11 of the other reaction medium. Consequently, the coolant flow is channeled without intersections from the coolant main duct 5 through the distribution region 14 to the active region 13.

FIG. 6 shows, on the contrary, the possibility that the coolant flow, indicated by solid line, is channeled through a plurality of the intersection regions 15 with the reduction 16 of the web height, and the coolant flow is branched off at exactly two of the intersection regions 15. Consequently, the coolant flow is channeled without intersections from the coolant main duct 5 through the distribution region 14 to the active region 13.

As a result, an equal distribution of heat already in the distribution region 14 is possible, since the coolant can be evenly distributed over the bipolar plate 3 and thus evenly over the entire fuel cell stack 1.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate formed from two single plates joined together, which are formed with a reactant flow field on their plate surfaces facing away from each other, comprising:
    multiple flow ducts for a reaction medium, bounded by walls of webs, wherein the webs and the flow ducts of one of the single plates run opposite the webs and the flow ducts of the other of the single plates in an active region, thus forming coolant ducts of a coolant flow field extending between the single plates,
    the reactant flow fields and the coolant flow field being each connected fluidically to a media port across a distribution region situated outside the active region,
    and there being a cross channeling of the two reaction media for a portion in the distribution region,
    wherein, for the channeling of the coolant in the distribution region free of cross currents, at least one of the single plates is formed with a reduction in height of the webs on its plate surface facing toward the other of the single plates in an intersection region of the reaction media channels, so that two adjacent flow ducts are fluidically connected by the reduction.

2. The bipolar plate according to claim 1, wherein the coolant is channeled up to the intersection region of a negative of one of the single plates, and the coolant is then channeled from the intersection region of a negative of the other of the single plates.

3. The bipolar plate according to claim 1, wherein the coolant is channeled up to the intersection region of a negative of one of the reactant flow fields of the single plates, and the coolant is then channeled from the intersection region of a negative of the other of the reactant flow fields of the single plates.

4. The bipolar plate according to claim 1, wherein along the reduction-free webs of one of the single plates there is a plurality of reductions in height of the webs of the other of the single plates.

5. The bipolar plate according to claim 4, wherein a number of the reductions decreases with increasing flow distance from their corresponding media port.

6. The bipolar plate according to claim 4, wherein the reduction-free webs of one of the single plates are formed with a stepwise decreasing length with increasing flow distance from their corresponding media port.

7. The bipolar plate according to claim 1, wherein the coolant flow is channeled through a plurality of the intersection regions with the reduction of the web height, and the coolant flow is deflected at exactly one of the intersection regions.

8. The bipolar plate according to claim 1, wherein the coolant flow is channeled through a plurality of the intersection regions with the reduction of the web height, and the coolant flow is deflected at exactly two of the intersection regions.

9. The bipolar plate according to claim 1, wherein the reduction forms a web height of zero.

10. A fuel cell stack comprising a plurality of fuel cells having bipolar plates according to claim 1.

* * * * *